(12) United States Patent
Kim et al.

(10) Patent No.: US 7,277,646 B2
(45) Date of Patent: Oct. 2, 2007

(54) DUOBINARY OPTICAL TRANSMITTER

(75) Inventors: Hoon Kim, Suwon-si (KR);
Seong-Taek Hwang, Pyeongtaek-si (KR)

(73) Assignee: Samsung Electronics Co., Ltd., Suwon-si, Gyeonggi-Do, Korea (KR)

( * ) Notice: Subject to any disclaimer, the term of this patent is extended or adjusted under 35 U.S.C. 154(b) by 554 days.

(21) Appl. No.: 10/862,251

(22) Filed: Jun. 7, 2004

(65) Prior Publication Data

US 2005/0053382 A1 Mar. 10, 2005

(30) Foreign Application Priority Data

Sep. 9, 2003 (KR) ............ 10-2003-0063350

(51) Int. Cl.
*H04B 10/04* (2006.01)
(52) U.S. Cl. .................. 398/185; 398/184; 398/188
(58) Field of Classification Search ............ 398/65, 398/152, 184, 188, 185, 186, 189
See application file for complete search history.

(56) References Cited

U.S. PATENT DOCUMENTS 6,646,774 B1 * 11/2003 Willner et al. ............ 359/246

2002/0101639 A1 8/2002 Yano
2002/0196508 A1 * 12/2002 Wei et al. ............ 359/183
2003/0002121 A1 * 1/2003 Miyamoto et al. ......... 359/183

FOREIGN PATENT DOCUMENTS

EP 0825733 A2 2/1998
EP 0964538 A2 12/1999

OTHER PUBLICATIONS

"Dispersion-Tolerant Transmission Using a Duobinary Polarization-Shift Keying Transmission Scheme;" A Shamim Siddiqui et al.; IEEE Photonics Technology Letters, vol. 14, No. 2; Feb. 2002; XP001123175; 2 pgs.

* cited by examiner

*Primary Examiner*—Christina Leung
(74) *Attorney, Agent, or Firm*—Cha & Reiter, LLC.

(57) ABSTRACT

An optical transmitter for generating an optical signal includes: a precoder for coding an electrical signal of binary data; a continuous-wave (CW) light source for generating a continuous wave light; an optical phase modulator for modulating the phase of an optical signal outputted from the CW light source according to an electrical signal outputted from the precoder; a birefrigent material for bi-refracting a signal outputted from the optical phase modulator and for outputting the bi-refracted signal; and a polarizer for permitting only optical signals of a specific polarization direction to transmit therethrough when optical signals outputted from the birefrigent material are applied.

11 Claims, 3 Drawing Sheets

DUOBINARY OPTICAL TRANSMITTER

CLAIM OF PRIORITY

This application claims priority to an application entitled "Duobinary optical transmitter," filed in the Korean Intellectual Property Office on Sep. 9, 2003 and assigned Serial No. 2003-63350, the contents of which are hereby incorporated by reference.

BACKGROUND OF THE INVENTION

1. Field of the Invention

The present invention relates to a duobinary optical transmitter employing a duobinary optical transmission technique.

2. Description of the Related Art

In general, a dense wavelength division multiplexing (DWDM) optical transmission system has an excellent communication efficiency as it can transmit an optical signal having multiple channels with different wavelengths through a single optical fiber. Also, the DWDM system is capable of transmitting a larger amount of signals at a lower transmission speed by increasing the number of channels. Accordingly, the DWDM systems are now widely used in ultra-high speed internet traffic networks. Currently, systems capable of transmitting more than a hundred channels through a single optical fiber, using the DWDM technology, are commonly used. Various research is being actively conducted to develop a system which can transmit even higher than two hundred channels of 40 Gbps through a single optical fiber simultaneously at a transmission speed of greater than 10 Tbps.

However, the transmission capacity is restricted due to severe interference and distortion between channels if the channel spacing is less than 50 GHz using the conventional non-return-to-zero (NRZ) method to modulate the light intensity. Transmission distance is restricted in the high-speed transmission of greater than 10 Gbps since a direct current (DC) frequency component of a conventional binary NRZ transmission signal and a high frequency component spread during the modulation cause non-linearity and distribution when the binary NRZ transmission signal propagates in an optical fiber medium.

Recently, optical duobinary technology has been highlighted as an upcoming transmission technology capable of overcoming the above transmission restriction due to chromatic dispersion effect. A duobinary modulation method has a characteristic in that information is loaded based on the intensity of an optical signal and the phase of a signal is reversed at a '0' bit. Since a duobinary signal has a narrower bandwidth than that of a conventional OOK signal, it is advantageous in reducing channel widths in a DWDM optical transmission system. Also, since the duobinary signal has a strong immunity against optical fiber chromatic dispersion, the duobinary signal can be transmitted two or three times further in comparison with a case of using an OOK signal. Furthermore, since the duobinary signal doesn't have a carrier tone component (i.e., DC frequency component) in an optical spectrum, the duobinary signal is advantageous in that it is strong against the stimulated Brillouin scattering (SBS).

FIG. 1 illustrates a conventional duobinary optical transmitter.

Referring to FIG. 1, the conventional duobinary optical transmitter includes: a pulse pattern generator (PPG) 10 for generating a 2-level electrical pulse signal; a precoder 20 for encoding the 2-level NRZ electrical signal; low pass filters 30 and 31 for changing the 2-level NRZ electrical signals outputted from the precoder 20 into 3-level electrical signals and reducing the bandwidth of the signals; modulator driving amplifiers 40 and 41 for amplifying the 3-level electrical signals to output optical modulator driving signals; a laser source 50 for outputting a carrier; and a Mach-Zehnder interferometer type optical intensity modulator 60.

The 2-level electrical pulse signals generated from the pulse pattern generator 10 are encoded in the precoder 20, and the 2-level binary signals outputted from the precoder 20 are inputted in the low pass filters 30 and 31, respectively. It is ideal that the low pass filters 30 and 31 are $cosine^2$-shapedfilters. However, the low pass filters 30 and 31 may be approximately realized by using Bessel-Thomson filters. In a case in which a bandwidth of the low pass filters 30 and 31 have a bandwidth of −3 dB corresponding to ¼ of a binary data speed, for example, 2.5 GHz filters in the case of 10 Gb/s data, binary signals having undergone the low pass filters 30 and 31 are changed into band-limited ternary signals. That is, each of the low pass filters 30 and 31 has a bandwidth corresponding to about ¼ of the clock frequency of the 2-level binary signals. This excessive restriction to the bandwidth causes interference between codes, thereby changing the 2-level binary signal to a 3-level duobinary signal.

The 3-level duobinary signals are amplified in the modulator driving amplifiers 40 and 41 and then utilized as signals for driving the Mach-Zehnder interferometer type optical intensity modulator 60. The phase and light intensity of the carrier outputted from the laser source 50 are modulated by a driving signal of the Mach-Zehnder interferometer type optical intensity modulator 60, so that the modulator 60 outputs a 2-level optical duobinary signal modulated from the carrier. Herein, the positions of the low pass filters 30 and 31 and the modulator driving amplifiers 40 and 41 may be switched with each other.

Note that since a duobinary signal generated in the optical transmitter greatly depends on the characteristic of the low pass filter, the performance of the optical transmitter is greatly changed according to the pattern length of an applied binary signal. Also, using a Mach-Zehnder modulator, the optical transmitter is very sensitive to a change of a bias voltage. Therefore, when a bias voltage of the Mach-Zehnder modulator is changed due to the temperature change of the optical transmitter and so forth, the performance of a system can be deteriorated.

Such a duobinary optical transmitter has problems in that distribution is strong and a signal bandwidth is narrow. In order to solve these problems, a duobinary optical transmitter using a phase modulator and an optical filter has been proposed.

FIG. 2 is a block diagram illustrating a duobinary optical transmitter using a phase modulator and an optical filter. In FIG. 2, a precoder 110, a driving amplifier 120, and a laser source 130 are identical to those shown in FIG. 1, so the detailed description of those will be omitted.

Referring to FIG. 2, a binary data signal encoded by the precoder 110 is applied to an optical phase modulator 140 through the driving amplifier 120, and the optical phase modulator 140 modulates the phase of an inputted optical signal. A phase-modulated optical signal is converted into a duobinary signal through an optical filter 150—for example, 7 GHz filter in a case of 10 Gb/s data—which has a bandwidth corresponding to about 70% of a binary signal transmission speed.

With the optical transmitter shown in FIG. 2, although a generated duobinary signal has some lower immunity against the chromatic dispersion of an optical fiber in comparison with that of the optical transmitter shown in FIG. 1, the dependency problem according to a bias position of the Mach-Zehnder modulator and a pattern length appearing in the optical transmitter shown in FIG. 1 can be solved. However, the optical transmitter of FIG. 2 requires an optical filter having a narrow passband as well as an excellent dispersion characteristic, and thereby its realization is not easy.

SUMMARY OF THE INVENTION

Accordingly, the present invention relates to a duobinary optical transmitter capable of removing the disadvantage of the conventional duobinary optical transmitter and solving the dependency problem according to a bias position of the Mach-Zehnder modulator and a pattern length.

One aspect of the present invention is to provide a duobinary optical transmitter which solves a problem of requiring an optical filter with a narrow passband.

Another aspect of the invention is to provide an optical transmitter for generating an optical signal. The optical transmitter includes: a precoder for coding an electrical signal of binary data; a continuous-wave (CW) light source for generating a continuous wave light; an optical phase modulator for modulating the phase of an optical signal outputted from the CW light source according to an electrical signal outputted from the precoder; birefringent material (or birefringent medium) for applying a time delay to a signal outputted from the optical phase modulator, depending upon the polarization state inputted to the birefringent material; and a polarizer permitting only optical signals of a specific polarization direction to transmit therethrough when optical signals outputted from the birefringent material are applied.

BRIEF DESCRIPTION OF THE DRAWINGS

The above features and advantages of the present invention will be more apparent from the following detailed description taken in conjunction with the accompanying drawings, in which.

DETAILED DESCRIPTION

Hereinafter, a duobinary optical transmitter according to preferred embodiments of the present invention will be described with reference to the accompanying drawings. For the purposes of clarity and simplicity, a detailed description of known functions and configurations incorporated herein will be omitted as it may make the subject matter of the present invention unclear.

Figure 1:
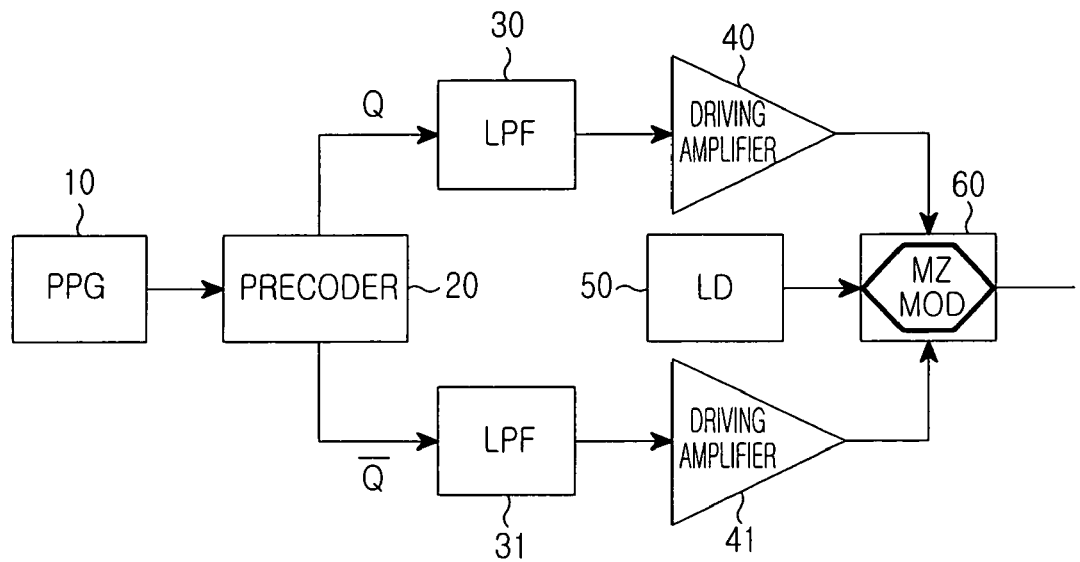
FIG. 1 is a view illustrating an example of a structure of a conventional duobinary optical transmitter.
Figure 2:
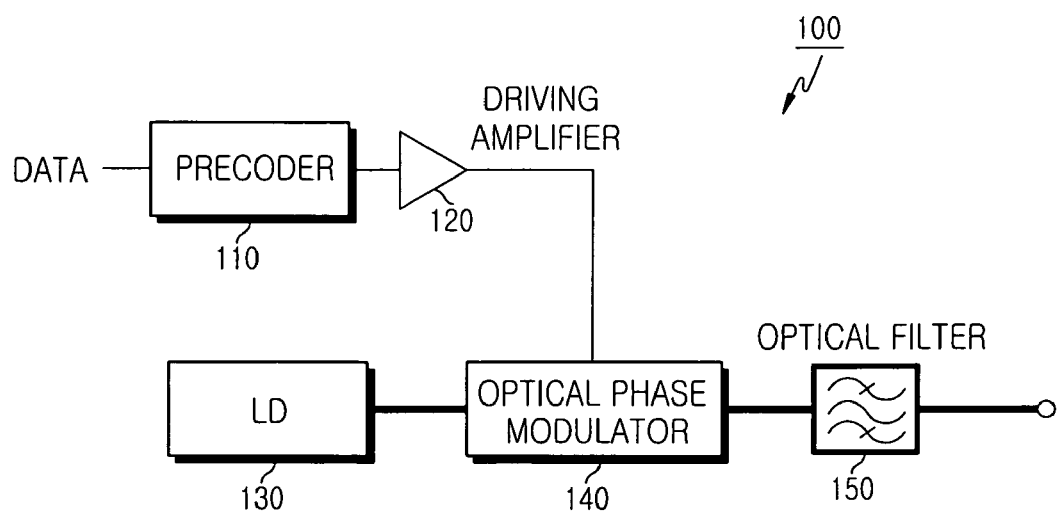
FIG. 2 is a block diagram illustrating a duobinary optical transmitter using a phase modulator and an optical filter.
Figure 3:
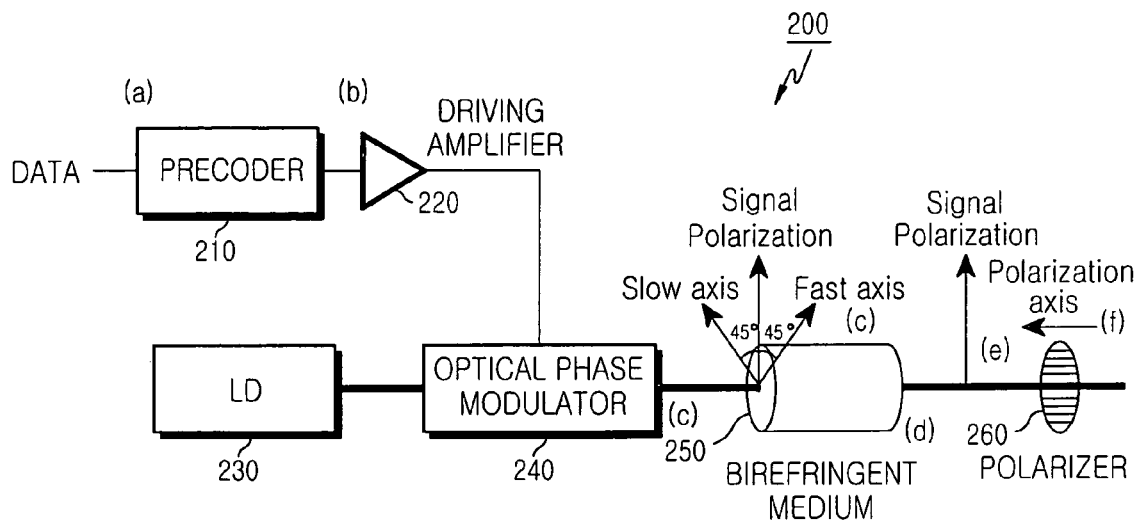
FIG. 3 is a construction view illustrating a duobinary optical transmitter according to a first embodiment of the present invention.

Referring to FIG. 3, a duobinary optical transmitter according to a first embodiment of the present invention includes: a continuous wave (CW) laser 230 for generating continuous-wave optical signals; an optical phase modulator 240 for modulating the phase of an optical signal outputted from the CW laser 230 according to au applied electrical signal; a precoder 210 for encoding a 2-level NRZ electrical signal; a modulator driving amplifier 220 for amplifying the 2-level electrical signal and outputting a driving signal for the optical phase modulator 240; a birefrigent material 250 having two refractive indices or mare; and a polarizer 260 for permitting only optical signals having a specific polarization direction to transmit therethrough. The CW laser 230 generates continuous-wave optical signals and provides the generated continuous-wave optical signals to the optical phase modulator 240, and the (CW laser 230 can be realized by a continuous-wave laser diode.

Figure 4:
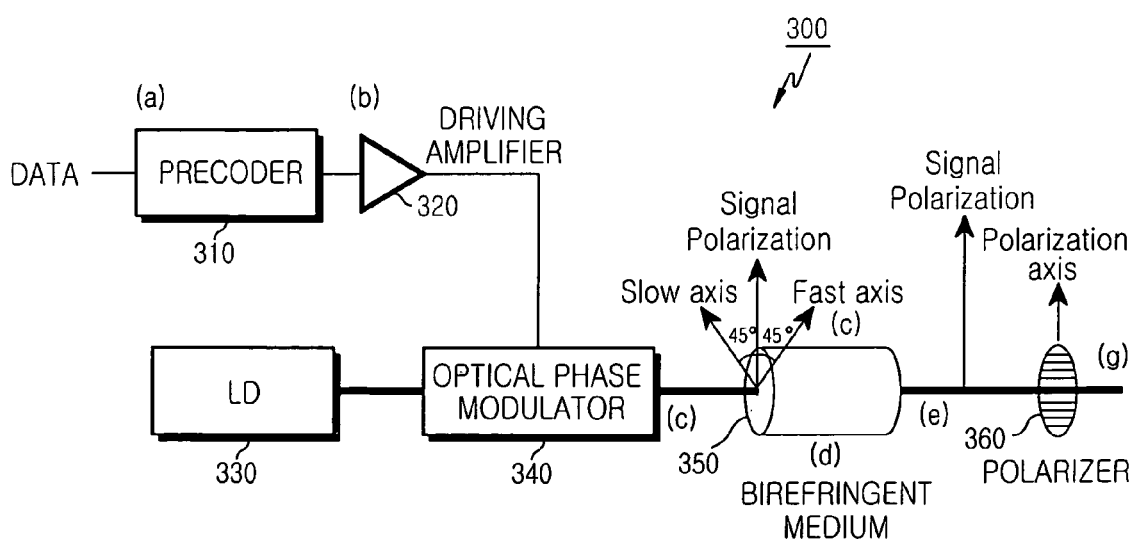
FIG. 4 is a construction view illustrating an alternate mark inversion optical transmitter according to a second embodiment of the present invention.

Referring to FIG. 4, a duobinary optical transmitter according to a second embodiment of the present invention includes the same constructions as those of the duobinary optical transmitter according to the first embodiment, except for the construction of the polarizer 360 in which the direction of polarization axis is different from FIG. 3. Thus, the discussion of the same components will be avoided to save redundancy.

Hereinafter, the operation of the duobinary optical transmitter having the above-mentioned constructions according to the present invention will be described with reference to a waveform view shown in FIG. 5.

Figure 5:
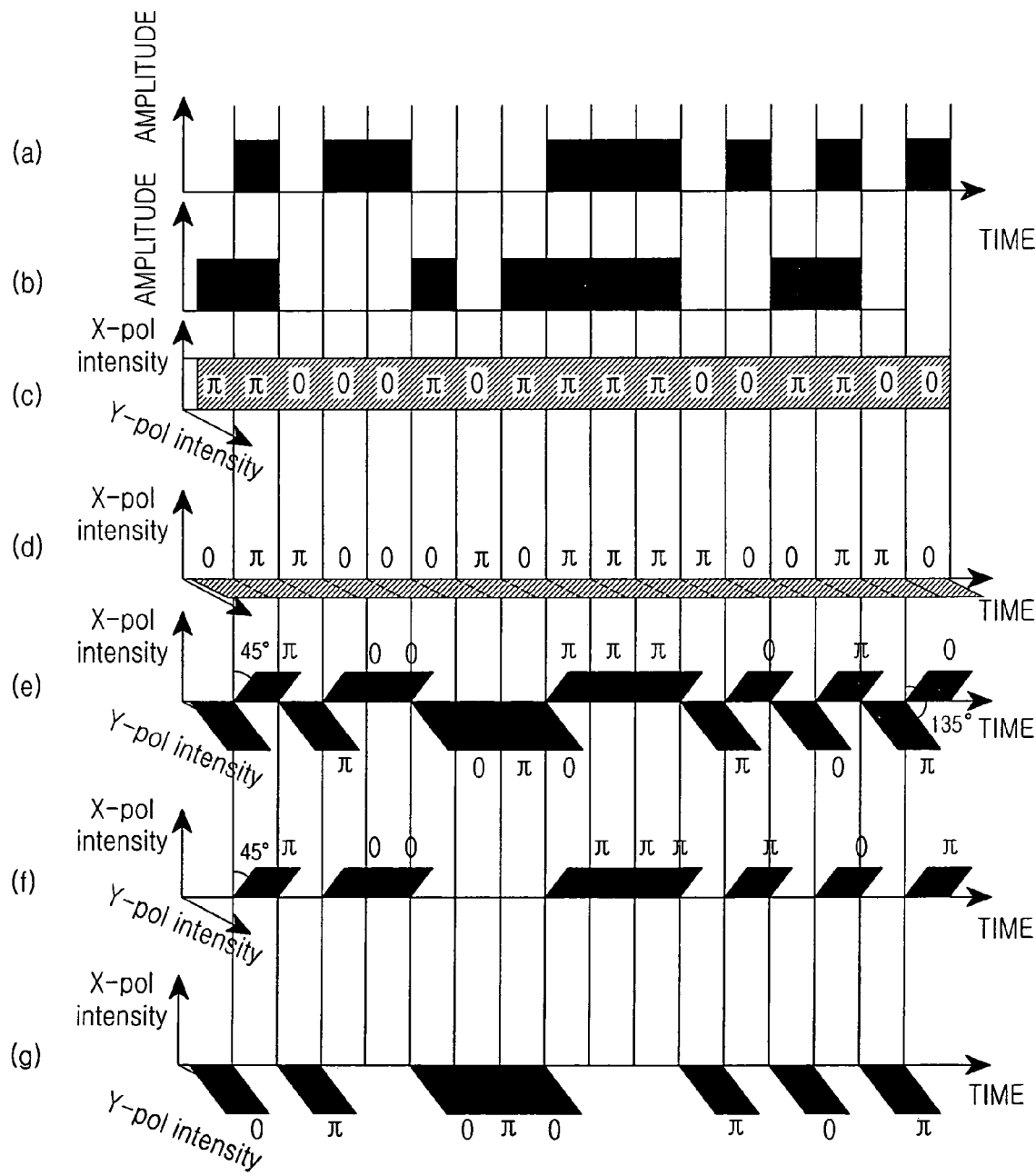
FIG. 5 is a view which illustrates an example of signal waveforms for explaining principals of duobinary/alternate mark inversion optical transmitters according to the present invention.

Referring to FIGS. 3 to 5, a binary data signal shown in a graph (a) of FIG. 5 is inputted into a duobinary optical transmitter 200 or 300 according to an embodiment of the present invention. The binary data signal is first inputted a precoder 210 or 310 in the duobinary optical transmitter 200 or 300. In this embodiment, the binary data signal, for example, has a data sequence of '01011000111010101' as shown in a graph (a) in FIG. 5. The binary data signal is coded in the precoder 210 or 310 as shown in a graph (b) in FIG. 5.

The precoder 210 or 310, as generally known in the art, converts an inputted binary sequence into another sequence. Such a precoder 210 or 310 comprises an exclusive OR gate and a delay device. The exclusive OR gate receives a first input sequence and a second sequence delayed by 1 bit from the first input sequence as input data. The delay device delays the first input sequence and outputting the delayed sequence to the exclusive OR gate. The pre-coding processing is performed for converting binary data into appropriate data for transmission in an optical transmission system. A binary data signal outputted from the precoder 210 or 310 is applied to an phase modulator 240 or 340 through a modulator driving amplifier 220 or 320.

The phase modulator 240 or 340 modulates the phase of an optical signal provided from the CW laser 230 according to an applied electrical signal provided from the modulator driving amplifier 220 or 320. A phase-modulated signal is shown in a graph (c) in FIG. 5. In a graph (c) of FIG. 5, parts marked with oblique lines represents parts having an optical signal, and '0' and 'π' marked in each bit represents the relative phases of optical signals.

The phase-modulated signal as shown in a graph (c) in FIG. 5 is incident into a birefringent material 250 or 350. The birefringent material 250 or 350 applies a time delay to a signal outputted from the optical phase modulator 240 or 340, depending upon the polarization state inputted to the birefringent material. In this case, the polarization axis of the birefringent material 250 or 350 is set at 45° with respect to the polarization axis of an input signal. Therefore, half of an optical signal applied into the birefringent material 250 or 350 is transmitted to a fast polarization axis, and the remaining half of the optical signal is transmitted to a slow polarization axis. Assuming that a graph (c) in FIG. 5 shows an optical signal incident into the fast polarization axis, a graph (d) in FIG. 5 is a view illustrating an optical signal incident into the slow polarization axis. Note that, in FIG. 5, the fast polarization axis of the birefringent material 250 or 350 is in the same direction as X polarization axis, and the slow polarization axis is in the same direction as Y polarization axis.

The difference between the refractive indices of the birefringent material 250 or 350 is set to be identical to one bit duration of the transmision speed of an applied binary sognal. When the difference of the refractive index of the birefringent material 250 or 350 is determined, the length of the birefringent material 250 or 350 is calculated as the following equation 1.

$$L = \frac{cT}{\Delta n} \qquad \text{Equation 1}$$

Herein, $\Delta n$ represents the difference between the refractive indices of the slow polarization axis and the refractive index of the fast polarization axis, "L" represents the length of the birefringent material, "c" represents the velocity of light, and "T" represents a bit duration of a binary signal. A signal having passed the fast and the slow polarization axis of the birefringent material 250 or 350 has a shape as shown in a graph (e) in FIG. 5 according to the polarization and phase relation of the signal.

Note that the birefringent material may be realized by a substance such as calcite, but it is preferred that the birefringent material is realized by an optical fiber type device so as to be used in an optical fiber communication system. Since a polarization maintaining fiber (PMF) has bi-refraction property as a type of optical fibers, it can be used as a birefringent material according to the present invention.

An optical signal having passed the birefringent material 250 or 350 is inputted into a polarizer 260 or 360. The polarizer 260 or 360 converts an optical signal inputted from the birefringent material 250 or 350 into a duobinary signal or an alternate mark inversion signal. The property of a signal having converted as described above is under the control of the polarization axis of the polarizer 260 or 360. That is, a duobinary signal is generated when the axis of the polarizer coincides with a 45° axis as shown in a graph (f) of FIG. 5, while an alternate mark inversion signal is generated when the axis of the polarizer corresponds to a 135° axis as shown in a graph (g) of FIG. 5. FIG. 4 shows an example of an optical transmitter in which the axis of the polarizer is set to correspond to the 135° axis, so as to generate an alternate mark inversion signal.

With the optical transmitters shown in FIGS. 3 and 4, the difference of the axis direction of the polarizer causes to change the respective optical transmitters to a duobinary or an alternate mark inversion optical transmitter. Therefore, a polarizer having an axis a direction of which is variable can be used to change an output signal to a duobinary or an alternate mark inversion signal according to necessity. In alternate embodiment, a polarization beam splitter instead of the polarizers can be used. In this case, a duobinary signal is outputted through one output terminal of the polarization beam splitter, and an alternate mark inversion signal is outputted through another output terminal thereof, so that a duobinary/alternate mark inversion optical transmitter can be realized.

According to the present invention, since the duobinary optical transmitter comprises a phase modulator, a birefringent material, and polarizer, the duobinary optical transmitter is not related to the bias of an optical modulator. Further, since the duobinary optical transmitter doesn't use a ternary signal, it doesn't have the dependency of pattern. Lastly, the duobinary optical transmitter according to the present invention doesn't use a narrow-band optical filter, realization of which is not easy as appreciated by skilled in the art, so that the duobinary optical transmitter can be economically realized.

While the invention has been shown and described with reference to certain preferred embodiments thereof, it will be understood by those skilled in the art that various changes in form and details may be made therein without departing from the spirit and scope of the invention as defined by the appended claims. Accordingly, the scope of the invention is not to be limited by the above embodiments but by the claims and the equivalents thereof.

What is claimed is:

1. An optical transmitter for generating an optical signal, comprising:
   a precoder configured to code an electrical signal of binary data;
   a continuous-wave (CW) light source configured to generate a continuous wave light;
   an optical phase modulator configured to modulate the phase of an optical signal outputted from the CW light source according to an electrical signal outputted from the precoder;
   a birefringent material configured to apply a time delay to a signal outputted from the optical phase modulator, depending upon the polarization state inputted to the birefringent material; and
   a polarizer configured to permit only optical signals having a specific polarization direction to transmit therethrough when optical signals outputted from the birefringent material are applied,
   wherein the polarizer comprises a polarization beam splitter that is configured to produce a duobinary signal as one output and an alternate mark inversion (AMI) signal as another output.

2. The optical transmitter as claimed in claim 1, wherein the optical phase modulator comprises a Mach-Zehnder modulator.

3. The optical transmitter as claimed in claim 1, wherein the birefringent material comprises a polarization maintaining fiber (PMF).

4. The optical transmitter as claimed in claim 1, wherein two outputs of the polarization beam splitter are path-switched so as to improve the reliability of a ring-shaped optical communication network.

5. The optical transmitter as claimed in claim 1, wherein the birefringent material comprises a material with a plurality of refractive indices, a difference of the refractive indices corresponding to an integer times a bit duration of a binary electrical signal.

6. The optical transmitter as claimed in claim 1, wherein a polarization axis of the birefringent material is set at 45° with respect to the polarization axis of the signal outputted from the optical phase modulator.

7. The optical transmitter as claimed in claim 1, wherein the CW light source is a continuous-wave laser diode.

8. The optical transmitter as claimed in claim 1, further comprising a driving amplifier coupled between the precoder and the optical phase modulator.

9. The optical transmitter as claimed in claim 1, wherein an optical signal applied to the birefringent material is transmitted to one of a slow polarization axis and a fast polarization axis.

10. The optical transmitter as claimed in claim 9, wherein one half of the optical signal applied to the birefrigent material is transmitted to the fast polarization axis and the other half of the optical signal is transmitted to the slow polarization axis.

11. The optical transmitter as claimed in claim 1, wherein an axis direction of the polarizer is selectively varied to change its output signal.

* * * * *